Figure 8:
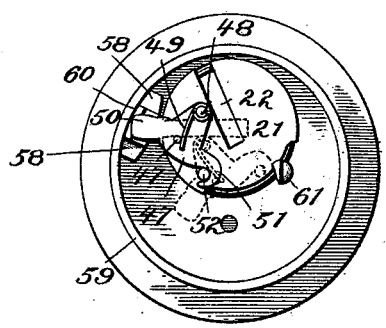

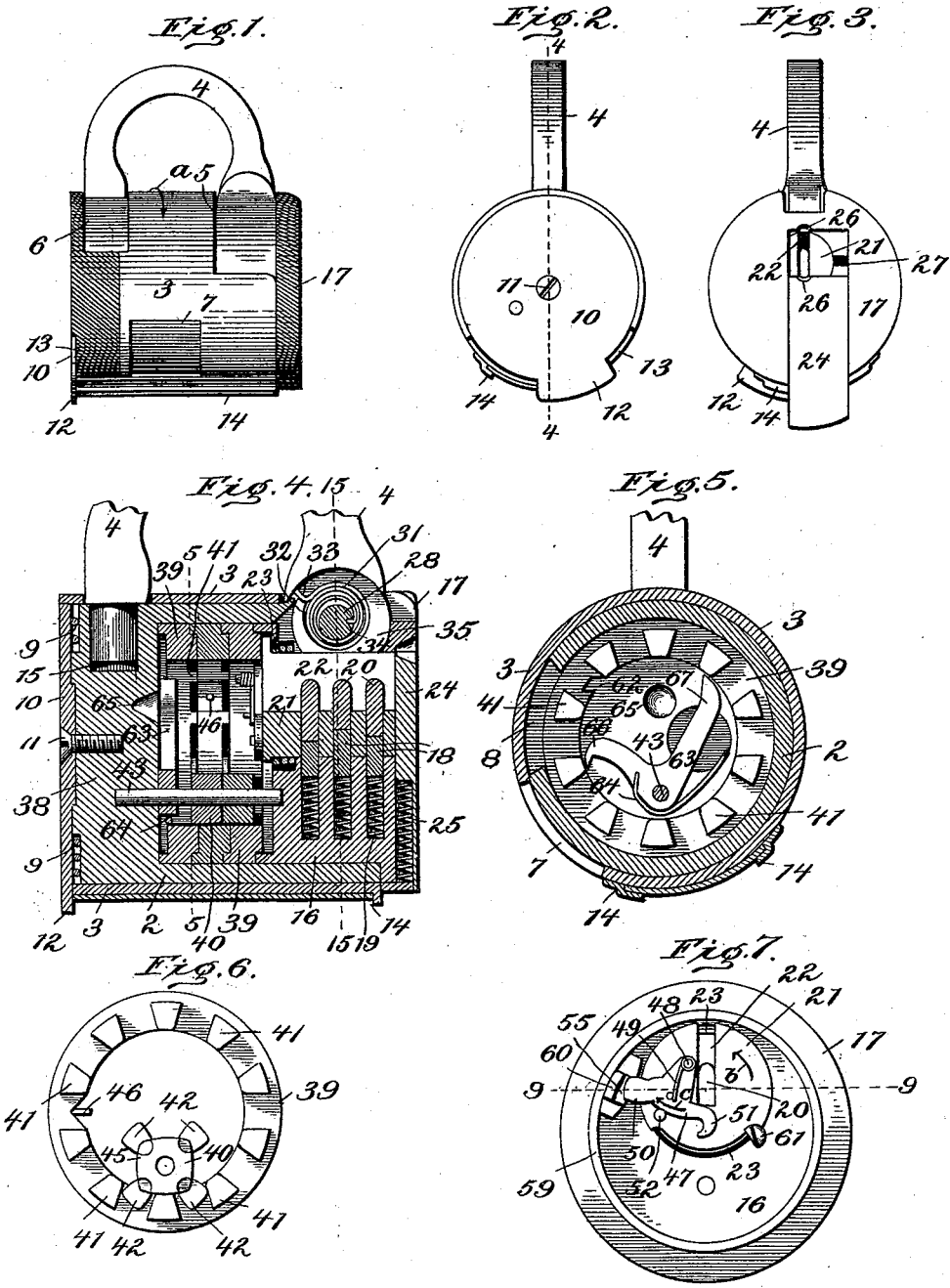

(No Model.) 3 Sheets—Sheet 2.
W. D. DOREMUS & F. W. BROOKS.
INDICATOR LOCK.

No. 497,640. Patented May 16, 1893.

(No Model.) 3 Sheets—Sheet 3.
W. D. DOREMUS & F. W. BROOKS.
INDICATOR LOCK.
No. 497,640. Patented May 16, 1893.
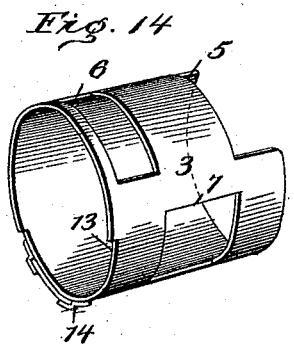
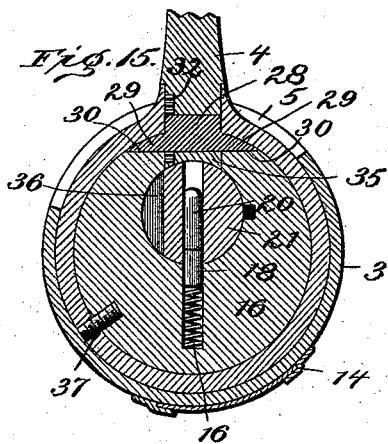
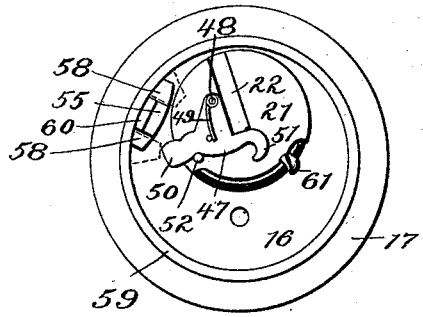
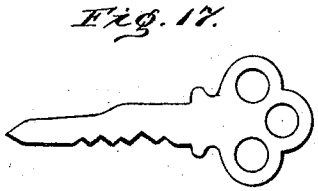
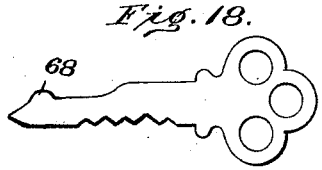
Witnesses
Edwin L. Bradford
Curtis Hammond
Inventors
Willard D. Doremus &
Franklin W. Brooks
By Wm C. McIntire
Attorney

UNITED STATES PATENT OFFICE.

WILLARD D. DOREMUS, OF CHARLTON HEIGHTS, MARYLAND, AND FRANKLIN W. BROOKS, OF NEW YORK, N. Y.; SAID DOREMUS ASSIGNOR TO SAID BROOKS; SAID BROOKS ASSIGNOR OF ONE-HALF THE WHOLE RIGHT TO RICHARD B. CONSTANTINE, OF NEW YORK, N. Y.

INDICATOR-LOCK.

SPECIFICATION forming part of Letters Patent No. 497,640, dated May 16, 1893.

Application filed January 25, 1893. Serial No. 459,731. (No model.)

*To all whom it may concern:*

Be it known that we, WILLARD D. DOREMUS, residing at Charlton Heights, in the county of Prince George's, State of Maryland, and FRANKLIN W. BROOKS, residing at New York city, in the county and State of New York, have invented certain new and useful Improvements in Register-Locks; and we do hereby declare the following to be a full, clear, and exact description of the invention, such as will enable others skilled in the art to which it appertains to make and use the same.

Our invention has for its object to produce a registering lock particularly adapted for use in the postal service of the Government, and the freight and express service of common carriers, although it is adapted for other uses. The objects particularly sought to be attained are neatness and compactness of design, the protection of the operative parts of the lock from the elements and from being tampered with, the security against the lock being picked or otherwise manipulated in an unauthorized manner, and simplicity and durability in the construction and arrangement of the parts.

The invention consists of a lock having the several features of novelty which are illustrated in the drawings and which we will presently describe.

In the drawings we have illustrated the preferred form of our invention, but it will be evident that in many of its features the invention is not limited to the precise construction and arrangement of the parts shown, and therefore we do not wish to be limited in detail thereto.

Figure 9:
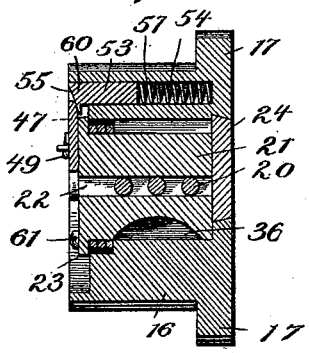
Figure 10:
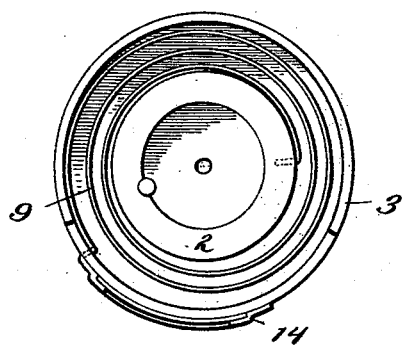
Figure 11:
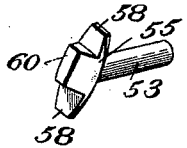
Figure 12:
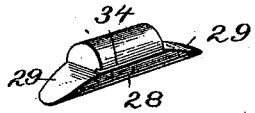
Figure 13:
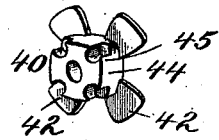

Referring to the drawings—Figure 1 is a side view of the complete lock. Fig. 2 is a rear end view. Fig. 3 is a front end view thereof. Fig. 4 is a central longitudinal section. Fig. 5 is a cross section on the line 5, 5, of Fig. 4 looking inward or backward. Fig. 6 is an end or face view of one of the number wheels or rings and one of the carrying wheels. Fig. 7 is an inner end view of the locking mechanism, removed from the casing. Fig. 8 is a similar view showing the parts of the lock in a different position. Fig. 9 is a horizontal section on the line 9, 9, of Fig. 7. Fig. 10 is a rear end view of the lock with the end plate removed. Fig. 11 is a detached perspective view of the locking pin or pawl for the registering mechanism. Fig. 12 is a detached perspective view of the fulcrum pin upon which the shackle swings. Fig. 13 is a detached perspective view of one of the carrying wheels of the registering apparatus. Fig. 14 is a perspective view of the shell which surrounds the casing of the lock, detached. Fig. 15 is a cross section on the line 15, 15, Fig. 4. Fig. 16 is a rear or inner end view of the locking mechanism proper showing a position of the parts different from that illustrated in Figs. 7 and 8. Fig. 17 is a plan view of the key which is ordinarily used with the lock. Fig. 18 is a plan view of the master key, by means of which the registering mechanism is unlocked after it has reached its limit of registration.

The casing in which the operative parts of the lock are mounted is designated by 2, and preferably consists of a cylindrical piece of metal provided with a central open-ended chamber closed at one end by the head 38, against which is placed a registering mechanism, while in line therewith and closing the end of chamber in the casing is the locking mechanism proper.

The shackle 4 of the lock is fulcrumed upon a support in the casing near its forward end and lies in a plane parallel with the line drawn longitudinally through the casing, this arrangement in connection with that of the lock mechanism and registering devices making an exceedingly compact lock.

3 is a shell surrounding the casing 2 and having a limited motion thereon. It is provided with three slots or cut away portions designated by 5, 6 and 7. The cut away portion 5 of the shell 3 comes opposite to the fulcrumed or pivoted end of the shackle, and the cut away portion 6 opposite to the outer or free end thereof. The slot 7 is so situated that it can be brought opposite to the opening 8 in the casing 2 through which the registering wheels are inspected.

The shell 3 is connected with the casing 2 by means of a spring 9 which tends to move the shell around the casing in the direction of the arrow $a$, Fig. 1.

10 is a plate secured to the rear end of the casing, as by a screw 11, and serving to cover and conceal the spring 9. This plate is provided with a projection 12 which extends into a recessed or cut away portion 13 of the shell 3, and serves as a stop or an abutment for limiting the movement of the shell in a manner to be presently described.

14 is an open ended slide-way formed upon the outside of the shell 3 and adapted to receive a card or tag upon which can be placed any suitable printed matter.

When the lock is in the position shown in Fig. 1, that is with the shackle down and in locked position, the spring 9 turns the shell 3 so that one edge of the slot 6 bears against the free end of the shackle and is thereby stopped. When in this position the opening 8 through the casing is closed by the shell, and the projection 12 on the plate 10 coming opposite to the end of the slide-way in which is situated the card, serves to hold the latter in the same. When the shackle is raised, as when it is unlocked, the spring carries the shell 3 farther in the direction indicated by the arrow $a$, and until it is stopped, either by the end of the slot 5 coming in engagement with the pivoted end of the shackle or with a raised portion of the casing adjacent thereto, or by the shoulder bounding the recess 13 striking the projection 12. This further movement results in covering the opening 15 in the casing into which the free end of the shackle enters so that it cannot become accidentally locked by falling or being forced into the opening 15. This movement of the shell also results in uncovering the end of the slide-way 14 so that the card therein can be removed if desired. It will be apparent that the shell 3 can be turned backward or against the action of the spring 9 whenever desired, and whether the shackle be raised or lowered, in order to uncover the opening 8 so that the numbers upon the registering wheels can be read.

The form of lock mechanism proper which I prefer to use in my registering lock is what is known as the Yale or spring pin lock.

16 indicates the plug or body of the lock proper which is shaped to fit tightly into the forward end of the casing 2, and is provided at its outer end with a flange 17 which in effect constitutes an end plate for the entire lock. The drivers 18 and springs 19 which operate them are mounted in holes in the plug 16 in the usual manner, and the pins 20, which co-act with the drivers 18 to form the combination of the lock mechanism are mounted in the spindle 21 of the lock in which is the usual key slot 22. The spindle 21 is free to be turned within the plug 16 whenever the pins 20 are depressed to the proper extent by the key, but a spring 23 connecting the spindle with the plug tends to return the spindle to the position indicated in Figs. 3 and 4 whenever the key is removed.

24 is a slide mounted in a recess in the outer end of the body 16 of the lock and held up by a spring 25 so as to cover the end of the spindle 21 and the key slot therein. The upper edge of the slide 24, and the adjacent edge of the plate 17 are beveled as at 26 and together form a tapering opening opposite the upper portion of the key slot 22 so that when it is desired to insert the key in the lock it is only necessary to place the point thereof opposite this opening and push the key forward into the lock, and this will result in forcing down the slide, into the position shown in Fig. 3.

In ordinary Yale locks it is necessary to turn the spindle back to the original position, that is the position which it occupies when locked by the drivers 18 before the key can be removed, but as this is undesirable in the use of our lock we provide means whereby the key can be removed when the spindle has been turned to carry the pins 20 out of line with the drivers 18. This we accomplish by slotting the plug 16, as at 27, the said slot extending to an opening into the opening in which the spindle 21 is placed. When the spindle is so far turned that the key comes opposite to this slot, the key can be moved out into this slot away from the pins 20 past which it can then be withdrawn even though such pins project into the opening 22 to different extents.

The shackle is supported so as to swing upon a pin 28, illustrated in detail in Fig. 12, and which is held against turning with the shackle in a novel manner. The pin is extended beyond the central portion upon which the shackle is mounted to form two wings 29 which serve the double function of securing it to the lock and of preventing it from turning. These wings rest in recesses 30 formed in the outer surface of the plug 16, and when the latter is slid into place in the casing, the inner surface of the latter rests directly over the outer faces of the wings 29 holding them in place in the recesses 30. The reason for making the wings 29 beveled as shown is to avoid the necessity for constructing specially formed seats therefor on the inner surface of the casing 2, as by making the bevel of the wings to correspond in shape with the inside of the chamber in the casing into which the plug of the lock is inserted, the latter can be easily slid into place, and a tight fit insured. It will be evident that seats for the wings or extensions 29 could be formed in the casing 3 instead of in the plug or body of the lock, the object sought to be attained being to secure the shackle pin between the casing and lock body in such manner as will not interfere with the latter being freely slipped into and out of the former.

31 is a spring which normally tends to throw the free end of the shackle upward. It is preferably of coiled form and situated within a recess 32 in the pivoted end of the shackle and has one end bearing against an abutment 33 thereof and the other end connected with the non-rotating pin 28 upon which the shackle swings. This latter connection we effect by slotting the pin, as at 34, and inserting one end of the spring 31 therein.

The pivoted end of the shackle bears directly upon the spindle 21 in rear of the pivot pin 28, as indicated at 35, whereby it is held in a depressed or locked position. It will be evident that when the parts are in the position shown in Fig. 4 that the free end of the shackle cannot be raised because of the engagement of the portion 35 of the shackle with the outer surface of the spindle. When however the spindle is turned the required distance to effect an unlocking, a recessed or cut away portion 36 thereof is brought opposite to the end 35 of the shackle which can then, under the influence of the spring 31, or by hand, be raised, the portion 35 of the shackle entering the recess 36. This results in locking or holding the spindle in a turned position where it will remain until the shackle is moved down with its free end in the socket 15, when the spindle will be turned to the position indicated in Fig. 4, by the spring 23, and the shackle be locked. When it is considered that the spindle 21 cannot be turned until the shackle is moved into its depressed position, and that often considerable time elapses between unlocking the shackle and again locking it, the advantage of providing means for withdrawing the key when the shackle is raised and the spindle turned will be apparent.

The plug 16 in which is mounted the locking mechanism can be held from turning or sliding in the casing 2 by means of a screw 37 passing through the wall of the casing and into the plug, as shown in Fig. 15.

The registering mechanism which is situated between the head 38 of the casing 2, and the lock mechanism, may be of any suitable and approved construction. That form of registering mechanism which we have illustrated consists of three number wheels or rings 39 arranged side by side and the necessary carrying wheels 40. The side faces of the number wheels 39 are provided with lugs or teeth 41 with which engage the wings 42 of the carrying wheels. The carrying wheels are mounted upon a shaft 43 which is supported at one end in the head 38 of the casing, and at its opposite end in a recess formed in the plug 16. The hub portions 44 of the carrying wheels are arranged to extend inside of the rings 39, as illustrated in Fig. 4, and are formed with the teeth 45, shown in Fig. 13, which are engaged by the pins 46 projecting inward in the path of said teeth from the number rings or wheels 39. There are ten of the lugs 41 to each wheel or ring 39 and one of the pins 46, and it will be apparent without further description that each time one of the wheels or rings makes a complete revolution it turns one of the carrying wheels one step by reason of the engagement of the pin 46 with one of the teeth 45, and this movement of the carrying wheel advances the next number ring or wheel one step by the engagement of one of its wings 42 with one of the lugs 41 thereon.

The outside diameter of the number wheels or rings 39 is the same as the inside diameter of the casing 2 in contact with which the wheels move, so that no support therefor except the casing is required.

I will now describe the mechanism whereby each time the lock is operated and the spindle 21 turned to release the shackle, the registering device is caused to move forward one step or space.

47 is a dog mounted upon a pivot 48 projecting from the inner end of the spindle 21. This dog constitutes the driver between the locking and the registering mechanism, and it has two arms 50, 51, the former of which is adapted to engage with the lugs 41 on the units wheel to advance the latter whenever the spindle is turned to unlock the shackle, and which also operates to disengage a catch or lock which holds the registering device against accidental forward or backward movement. The other arm 51 is hook shaped and is engaged by the pin 52 carried by the spindle to move the dog so that the arm 50 will disengage the units wheel at the proper time.

49 is a spring which tends to rock the dog upon its support in the direction indicated by the arrow c in Fig. 7.

53 is a catch or locking device for holding the registering mechanism against accidental movement. It consists of a pin, the outer end or head 60 of which is beveled as at 55, and the stem or shank 53 of which is mounted in a socket 57 wherein also is mounted a spring 54 which tends to throw the pin outward.

The preferred form of pin which constitutes the lock or catch for the registering apparatus is shown in Fig. 11. As there shown it is provided with thin laterally projecting arms or wings 58, 58, which bear against the inner overhanging flange 59 of the plug 16 and thereby serve to hold the pin from turning in its socket 57.

The size of the head 60 is such that it occupies practically the entire space between two of the teeth or lugs 41 on the units wheel which wheel, as shown in Fig. 16, rests close up against the flange 59 and with its lugs or teeth 41 inside thereof.

It will be apparent that whenever the catch 53 is forced outward by the spring 54 so that its head lies between two contiguous lugs on the units wheel, that the registering mechanism will thereby be prevented from being turned either forward or backward.

The position of the catch or locking pawl 53 relative to the spindle of the lock, and the driver for the registering mechanism, is such that when the parts are in the normal locked position, the end of the arm 50 is situated over the inner edge of the inclined face 55 of the locking catch or pawl, as shown in Fig. 7. When in this position the dog 47 is held from being carried by its spring so far over the inclined face of the spring catch or pawl as to depress it, by reason of its engagement with the lugs 41 of the number wheel. When however a key is inserted into the lock and the spindle turned in the direction of the arrow b, Fig. 7, the first movement imparted to the dog 47 is to rock it upon its fulcrum so that the end or arm 50 thereof comes over the head of the spring catch or pawl 53 and, depressing the same, results in unlocking the registering device. While, during this movement, the dog or driver has been turned by the spring 49 in the direction of the arrow c, Fig. 7, until the end of the arm 50 is fully over the spring pawl 53, and extends practically out to the flange 59,—the pin 52 has been moving with the spindle until it comes in engagement with the hook of the arm 51, and this position of the parts is illustrated in full lines in Fig. 8. The movements thus far described have taken place while the units wheel remains stationary. As soon however as the pin 52 engages with the hook 51 the further movement of the spindle is communicated to the dog which must then turn therewith, and its arm 51 being between two of the lugs 41 on the units wheel the latter must move with the spindle and dog, and this can be accomplished because the movements which have been already described have resulted in unlocking or freeing the units wheel from its locking pin or pawl.

A stop 61 permits the spindle to be turned a quarter of a revolution from its normal position, and when it has been turned to this extent the parts assume the position indicated in Fig. 8 by dotted lines.

In returning from the position illustrated in dotted lines in Fig. 8 to that illustrated in Fig. 7 the arm 50 of the dog moves inside the lugs 41 on the units wheel, and in passing the last one thereof it is tilted back into the position shown in Fig. 16, after passing which position it is forced into the position shown in Fig. 7 by its spring 49.

It will be understood that as soon as the dog 47 has advanced the units wheel one full step or movement that the catch or pawl springs into place between two of the lugs where it remains until the lock spindle begins to be again turned.

The last one of the numbering wheels or rings is provided with a recess 62 with which is adapted to engage a locking lever 63 mounted upon the shaft 43 and engaged by a spring 64 which tends to rock the lever so as to throw its hook end 66 into engagement with the recess 62. The recess is situated in such position that it comes opposite to the hook end of the locking lever when the figure 9 is exposed at the opening 8 in the casing, and it will be understood that when the lever 63 thus engages with the wheel or ring that the latter cannot be turned until the lever is disengaged therefrom. It will also be evident that after the lever 63 has locked the hundred wheel the units and the tens wheel can be operated until it becomes necessary to carry one to the hundreds when they too will be locked, and that then the number 999 will show at the opening 8 and the entire lock be locked or held from operating until the lever 63 is disengaged from the registering mechanism.

The key which is ordinarily employed, and which is illustrated in Fig. 17 will not operate the lever 63, but for that purpose a key similar to that shown in Fig. 18, and which we term the master key, must be used. This key is provided with a projection 68 which is adapted to engage with the arm 67 of the locking lever 63 and rock it so as to disengage the hook 66 from the registering wheel. The part of the master key which engages with the locking mechanism proper does not differ from the key shown in Fig. 17.

65 is a recess in the head 38 of the casing opposite the key slot 22 when in its normal position. This recess serves as a bearing and centering device for the master key. The key which is ordinarily used in connection with the lock may also be extended sufficiently far to engage with this recess.

It is our intention that the master key should be retained at a central office to which the lock must be returned after it has been used a certain number of times, say nine hundred and ninety-nine times, to be unlocked or disengaged from the locking lever 63 after which it can be again put into use, it being started out ordinarily with the registering wheels showing 000 through the opening 8.

A lock constructed according to our invention is exceedingly compact in its construction, and is closed or protected so there is little danger of its becoming filled with water and rendered inoperative by the water freezing even though it be used in the most exposed positions. The arrangement of the locking and the registering mechanisms is such as to prevent manipulation of the latter except by the ordinary use of the key.

Having thus described our invention, what we claim as new, and desire to secure by Letters Patent, is—

1. The combination with a lock of a shell surrounding the casing thereof and upon which it is free to be turned, the shell having formed therein the slots 5 and 6, the former being arranged adjacent to the pivoted end of the shackle of the lock, and the latter adjacent to the opening in the casing into which the free end of the shackle enters, and the former slot being longer than the latter, whereby when the shackle is raised or unlocked the shell can be turned so as to close the opening into which the free end enters, substantially as set forth.

2. In a registering lock, the combination of the cylindrical casing in which is mounted the registering and the locking mechanisms and provided with a shackle 4, and having the opening in the casing through which the registering mechanism can be seen, in combination with a cylindrical shell having the opening 7 adapted to be brought opposite to the opening 8 in the casing, and the slots or cut-away portions 5, 6, through which the shackle passes, the opening adjacent to the pivoted end of the shackle being the longer, substantially as and for the purpose set forth.

3. The combination with the lock having a cylindrical casing and a swinging shackle, of a cylindrical shell surrounding the casing and a spring connecting the shell and the casing of the lock and tending to turn the former on the latter, the shell being provided with a slot through which the free end of the shackle passes, and with a stop which limits the extent to which the spring can move the shell, whereby when the shackle is raised the shell is turned to cover the opening in the casing into which it opens, substantially as set forth.

4. The combination, with a lock having a cylindrical casing provided at one end with a projection 12, of a shell surrounding the lock and free to turn thereon, the slide-way 14 in the shell arranged to have its open end brought opposite to the projection 12, carried by the casing, by which latter the slide-way is closed, and the shackle arranged to hold the shell against turning and with a slide-way covered by the projection 12 when the lock is locked, substantially as set forth.

5. The combination of a lock having a cylindrical casing, the shackle 4, the shell surrounding the casing of the lock, the spring connecting the casing and the shell, and the covering plate 10 provided with a projection 12, adapted to limit the extent to which the shell can move upon the casing, the shell being provided with a slide-way adapted to receive a card, and the slots 5 and 6 through which the shackle extends, the slot at the pivoted end of the shackle being the longer, substantially as set forth.

6. In a registering lock the combination of the cylindrical casing, chambered out to form a shell with the head 38, the registering mechanism placed in the casing against the head 38, the locking mechanism placed in the casing and closing the end opposite the head, and the swinging shackle 4 adapted to be locked by the said locking mechanism and arranged parallel with the length of the casing, substantially as set forth.

7. In a lock, the combination of the casing having an internal open ended chamber, the locking mechanism mounted in a plug or body adapted to fit into and close one end of the said chamber, the said plug or body being provided with a flange 17 which covers the end of the lock casing when the parts are assembled and means for securing the said body of the lock in the casing, substantially as set forth.

8. In a lock the combination of the cylindrical casing having the open-ended chamber, a swinging shackle pivoted to the casing near its open end, the locking mechanism mounted in a plug or body adapted to fit into and close the open end of the chamber in the casing, and having a turning spindle adapted to be moved into engagement with the shackle to lock it, and means for securing the plug or body of the lock in the casing, substantially as hereinbefore set forth.

9. In a spring pin lock, the combination of the turning spindle provided with the key-slot and carrying the pins 20, and the body in which the spindle is mounted provided with the drivers for the pins, and with a slot out of line with such drivers into which the key can be slid when the spindle has been turned, substantially as set forth.

10. In a spring pin lock, the combination of the turning spindle provided with the key slot and carrying the pins 20, the body in which the spindle is mounted provided with the chambers for spring-actuated drivers 18, and with a slot out of line with the drivers into which the key can be slid when the spindle has been turned, and the spring which tends to return the spindle to its normal position, substantially as set forth.

11. In a lock, the combination with the turning spindle provided with the key-slot, the body in which the spindle is mounted having its end recessed, and the sliding spring actuated plate 24 mounted in the recess in the end of the body in which the spindle turns and adapted to cover the end of the spindle, substantially as set forth.

12. In a lock, the combination of the spindle adapted to be turned by the key, and the shackle mounted upon a pivot adjacent to the spindle and provided with a projecting portion in rear of its pivot which normally rests upon the spindle, the spindle being provided with a recess or cut-away portion adapted to be brought opposite the said projecting portion of the spindle when it is turned by the key, substantially as set forth.

13. In a lock, the combination of the casing provided with a central open-ended chamber, the locking mechanism mounted in a body or plug adapted to be slid into the said chamber, the shackle, and the fulcrum pin upon which the shackle is mounted provided with wings or projecting portions which lie between the casing and the lock body or plug and whereby the pin is held in place, substantially as set forth.

14. In a lock the combination of the casing provided with an open-ended chamber, the locking mechanism mounted in a body or plug adapted to be slid into the said chamber, the shackle, and the fulcrum pin on which the shackle swings provided with the wings 29 which lie in recesses 30 between the casing and the lock body or plug, and the spring secured to the pin and bearing against the shackle to raise it, substantially as set forth.

15. In a spring pin lock, the combination of the body in which the locking mechanism is mounted provided with a slot 27, the spindle 21 provided with the key-slot, and with a recess or cut-away portion 36, the shackle having a bearing upon the spindle whereby it is locked until the cut-away part 36 is brought opposite thereto, and the spring which tends to return the spindle to its normal position, substantially as set forth.

16. In a registering lock, the combination of the registering mechanism, the lock mechanism, a lock or catch which normally holds the registering mechanism against movement and the driver for operating the registering mechanism and releasing the said lock or catch when the locking mechanism is moved, substantially as set forth.

17. In a registering lock, the combination of the registering mechanism provided with lugs or teeth, the lock mechanism, a lock or catch which normally engages with the registering mechanism and holds it against movement, and the driver operated by the lock mechanism having an arm which moves the said catch from engagement with the registering mechanism and which engages with the lugs or teeth of such mechanism to move it, substantially as set forth.

18. In a registering lock, the combination of the registering mechanism, the first wheel of which has a series of lugs or teeth, the lock mechanism, a spring catch or lock adapted to be moved between the said lugs to hold the registering mechanism from turning, a pivoted driver or dog connected with the lock mechanism, means for moving it to trip the said spring catch and to carry it between the lugs of the said first wheel when the lock mechanism is first started, and means for advancing the said driver to turn the registering wheel, as the lock continues its movement, substantially as set forth.

19. In a registering lock, the combination of the registering mechanism, the first wheel of which has a series of lugs or teeth, the lock mechanism having a turning spindle, a spring catch or lock adapted to hold the registering mechanism, a driving dog pivoted to the spindle of the lock mechanism, means for turning the said dog on its pivot so as to trip the said spring catch and to carry it between the lugs of the registering wheels, and a projection which connects the said dog and the lock spindle and causes them to move together, and the dog to turn the registering wheel, substantially as set forth.

20. The combination of the registering mechanism, the first wheel of which has a series of lugs or teeth, the lock mechanism having a turning spindle, a spring catch or locking pawl 53 having a head adapted to lie between two adjacent lugs of the register wheel to lock it, and provided with a beveled face, the driving dog 47 pivoted to the lock spindle, and having the arm 50, the spring 49 bearing against the driving dog and tending to move the arm 50 thereof between the lugs of the register wheel, and the pin or projection on the spindle which engages with the dog and moves it with the spindle, substantially as set forth.

21. The combination of the registering mechanism, the first wheel of which is provided with a series of lugs 41, the lock mechanism having the body or case provided with the flange 59, and the turning spindle, mounted in the body or case, the spring catch mounted in a recess in the lock body or case and having a head 60 adapted to lie between two of the said lugs 41, and the wings or projections 58, which bear against the flange 59, and the driver operated by the lock spindle and serving to move the spring catch from engagement with the register wheel and to turn the latter, substantially as set forth.

22. In a registering lock the combination of the lock mechanism, the registering mechanism, the connecting driving mechanism between them, and the spring actuated lock for the registering mechanism which prevents further operation of the lock after a certain number is indicated by the register, substantially as set forth.

23. In a registering lock, the combination of the lock mechanism, the registering mechanism, the connecting driving mechanism between the locking and registering mechanisms, and the locking lever 63 adapted to engage with one of the wheels of the registering mechanism and stop the movements of the entire set when a certain number is indicated by the register, substantially as set forth.

24. In a registering lock, the combination of the casing 2 having a central chamber closed at one end by the head 38, the lock mechanism at the end of the casing opposite the head 38, the registering mechanism situated between the head 38 and the locking mechanism and having a series of number wheels and carrying wheels, the last of the number wheels being provided with a recess 62, and the locking lever 63 adapted to engage with the said recess and situated beyond the reach of the key which is ordinarily employed to work the lock, substantially as set forth.

In testimony whereof we affix our signatures in presence of two witnesses.

WILLARD D. DOREMUS.
FRANKLIN W. BROOKS.

Witnesses:
CURTIS LAMMOND,
D. G. STUART.